United States Patent
Saito (10) Patent No.: US 8,150,459 B2
(45) Date of Patent: Apr. 3, 2012

(54) INFORMATION APPARATUS AND CONTROLLING METHOD THEREOF

(75) Inventor: Koji Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 500 days.

(21) Appl. No.: 12/408,337

(22) Filed: Mar. 20, 2009

(65) Prior Publication Data

US 2009/0249099 A1    Oct. 1, 2009

(30) Foreign Application Priority Data

Mar. 26, 2008   (JP) .................................. 2008-81732

(51) Int. Cl.
    *H04M 1/00*         (2006.01)
(52) U.S. Cl. ................. 455/556.2; 455/556.1; 455/403; 455/550.1; 455/557; 710/110; 710/305; 340/7.32; 713/300
(58) Field of Classification Search .................. 713/300, 713/310, 313, 320, 324; 455/12.1, 403, 550.1, 455/555, 556.1, 556.2, 557, 558; 340/7.2, 340/7.32; 715/717, 741; 710/110, 305, 306, 710/313

See application file for complete search history.

(56) References Cited

U.S. PATENT DOCUMENTS

| | | | | |
|---|---|---|---|---|
| 5,528,248 A * | 6/1996 | Steiner et al. | ............ | 342/357.31 |
| 5,797,089 A * | 8/1998 | Nguyen | ........................ | 455/403 |
| 6,233,464 B1 * | 5/2001 | Chmaytelli | ................ | 455/556.2 |
| 6,314,303 B1 * | 11/2001 | Phipps | ........................ | 455/555 |
| 6,463,299 B1 * | 10/2002 | Macor | ........................ | 455/556.1 |
| 6,625,472 B1 * | 9/2003 | Farazmandnia et al. | ....... | 455/557 |
| 6,633,759 B1 * | 10/2003 | Kobayashi | .................... | 455/419 |
| 6,725,060 B1 * | 4/2004 | Chhatriwala et al. | ....... | 455/556.2 |
| 6,754,509 B1 * | 6/2004 | Kahn et al. | ................ | 455/556.1 |
| 6,771,980 B2 * | 8/2004 | Moon | ........................ | 455/553.1 |
| 6,941,160 B2 * | 9/2005 | Otsuka et al. | ................ | 455/566 |
| 6,947,975 B2 * | 9/2005 | Wong et al. | .................... | 709/217 |
| 6,976,217 B1 * | 12/2005 | Vertaschitsch et al. | ....... | 715/717 |
| 6,985,753 B2 * | 1/2006 | Rodriguez et al. | ......... | 455/550.1 |
| 6,999,800 B2 * | 2/2006 | Peng et al. | .................... | 455/574 |
| 7,203,516 B2 * | 4/2007 | Kim | .......................... | 455/556.1 |
| 7,366,549 B2 * | 4/2008 | Lee et al. | ...................... | 455/574 |

(Continued)

FOREIGN PATENT DOCUMENTS

JP         09-101848         4/1997

(Continued)

OTHER PUBLICATIONS

Yoshino et al. Group Digital Assistant: Shared or Combined PDA Screen. IEEE Transactions on Consumer Electronics. vol. 49. No. 3. Aug. 2003.*

(Continued)

*Primary Examiner* — Matthew Spittle (74) *Attorney, Agent, or Firm* — Staas & Halsey LLP (57) ABSTRACT

An information processing apparatus and method include mode controlling. A first information processing unit controls a telephone process using a radio communication unit and displays the image to display unit in response to a request, and a second information processing unit mutually operable in parallel with the first information processing unit controls a telephone process using the radio communication unit and makes the display unit display the image in response to a request. The mode controlling sets one of the first information processing unit and the second information processing unit to a master mode and sets other of the first information processing unit and the second information processing unit to a slave mode.

5 Claims, 6 Drawing Sheets

U.S. PATENT DOCUMENTS

| | | | |
|---|---|---|---|
| 7,383,061 B1 * | 6/2008 | Hawkins | 455/556.2 |
| 7,440,773 B2 * | 10/2008 | Son | 455/556.2 |
| 7,526,283 B2 * | 4/2009 | Karstens et al. | 455/418 |
| 7,623,892 B2 * | 11/2009 | Hawkins | 455/556.1 |
| 7,706,850 B2 * | 4/2010 | Parivash | 455/575.4 |
| 7,813,486 B2 * | 10/2010 | Vertaschitsch et al. | 379/93.17 |
| 7,877,692 B2 * | 1/2011 | Podnar et al. | 715/741 |
| 2001/0044321 A1 * | 11/2001 | Ausems et al. | 455/556 |
| 2003/0188077 A1 * | 10/2003 | Watts et al. | 710/313 |
| 2004/0121802 A1 * | 6/2004 | Kim et al. | 455/556.2 |
| 2004/0157642 A1 * | 8/2004 | Lee et al. | 455/556.2 |
| 2005/0086614 A1 | 4/2005 | Cheng et al. | |
| 2006/0203758 A1 * | 9/2006 | Tee et al. | 370/315 |
| 2007/0139369 A1 * | 6/2007 | Kao | 345/156 |

FOREIGN PATENT DOCUMENTS

| | | |
|---|---|---|
| JP | 09-319445 | 12/1997 |
| JP | 2002-351436 | 12/2002 |
| JP | 2005-128994 | 5/2005 |
| JP | 2005-278114 | 10/2005 |

OTHER PUBLICATIONS

Sorrentino, Phil. Throughput. vol. 29. No. 4. Apr. 2011.*
HighTech Computer Corp. PDA Phone. User Manual. 2007.*
Paek et al. Toward Universal Mobile Interaction for Shared Displays. Microsoft Research. 2004.*
Japanese Office Action issued on Jan. 10, 2012 in corresponding Japanese Patent Application No. 2008-081732.

* cited by examiner

INFORMATION APPARATUS AND CONTROLLING METHOD THEREOF

CROSS-REFERENCE TO RELATED APPLICATIONS

This application is based upon and claims the benefit of priority from the prior Japanese Patent Application No. 2008-81732 filed on Mar. 26, 2008, the entire contents of which are incorporated herein by reference.

FIELD

The present invention relates to an information processing apparatus and a controlling method thereof.

BACKGROUND

In recent years, hardware devices with smaller sizes and higher performance are increasingly being developed. This allows realization of systems of a plurality of different uses in a portable compact apparatus. In a single system, one or more operating systems (hereinafter, referred to as OS) are generally executed for a complete set of hardware resources such as a CPU (Central Processing Unit) and a RAM (Random Access Memory). In a compact apparatus as described above, for example, a complete set of hardware resources executing functions of a computer and a complete set of hardware resources executing functions of a cell-phone are each mounted as an independent system. Moreover, each system has a power source thereof. Also, an individual OS is executed for each system. Accordingly, two functions of a computer and a cell-phone are realized in a compact apparatus.

Incidentally, a computer is becoming increasingly capable of executing various functions alone. For example, a computer has become multimedia-capable in recent years, and a drive, an audio circuit, a sound source, speakers and the like are generally mounted thereon. Such a computer needs a lot of time after power-on until, for example, a music reproduction mechanism such as a music CD (Compact Disc) player is started up. Thus, a conventional technology to reduce the time until the startup by providing a switch to start only the music reproduction mechanism of a computer separately from the source of the computer main body is known.

When a computer and a cell-phone are realized in one system, a configuration in which a display chip (graphic chip) causing a screen of the computer and cell-phone to display is provided on the computer side only can be considered. However, when the two functions of a computer and a cell-phone are realized in one system using the above configuration, there are problems including those described below.

When an incoming call from an outside source is terminated after only the cell-phone is turned on, the compact apparatus cannot display a screen using the display chip on the computer side. Thus, for example, the user cannot check the originator's phone number of the incoming call.

If an incoming call from outside is terminated while only the cell-phone is turned on, there is a problem that it takes some time before the OS is started up even if the computer is turned on by the user at a time of the incoming call being terminated. If, on the other hand, both the cell-phone and computer are turned on in preparation for terminating processing of such an incoming call, the compact apparatus will use up batteries earlier because power consumption of particularly the computer is large.

SUMMARY

According to an embodiment, an information processing apparatus includes a display unit that displays an image, a radio communication unit that transmits and receives data with external apparatuses, a first information processing unit having a first telephone controlling unit that controls a telephone process using the radio communication unit and a first display requesting unit that makes the display unit display the image in response to a request from the first telephone controlling unit, a second information processing unit having a second telephone controlling unit and a second display requesting unit.

According to an embodiment, the second telephone controlling unit controls a telephone process using the radio communication unit, the second display requesting unit makes the display unit display the image in response to a request from a control unit inside the second information processing unit including the second telephone controlling unit, and the second information processing unit is mutually operable in parallel with the first information processing unit, and a mode controlling unit that controls so as to set one of the first information processing unit and the second information processing unit to a master mode. When the mode controlling unit sets the first information processing unit to the master mode, the first telephone controlling unit, the first display requesting unit, and the display unit are activated, and the second information processing unit is set to a slave mode in which the radio communication unit is activated and other functions are inactivated. And, when the mode controlling unit sets the second information processing unit to the master mode, the second display requesting unit, the second telephone controlling unit, and the radio communication unit are activated, and the first information processing unit is set to the slave mode in which the display unit is activated and other functions are inactivated.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

An embodiment of the present invention will be described below with reference to the drawings. However, the technical scope of the present invention is not limited to the embodiment. First, an overview of the embodiment will be provided.

Figure 1:
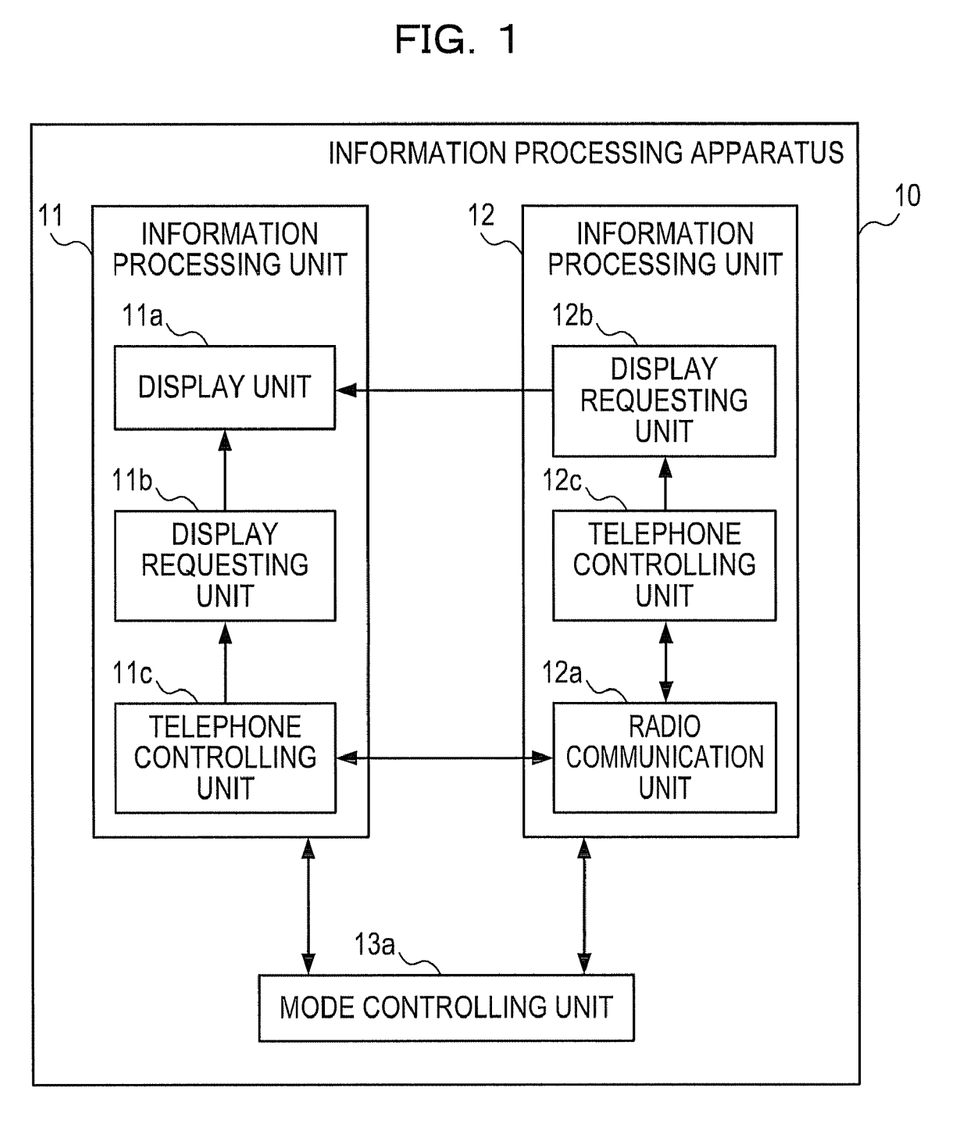
FIG. 1 is a conceptual diagram illustrating an embodiment.

FIG. 1 is a conceptual diagram illustrating an embodiment. An information processing apparatus 10 shown in FIG. 1 has an information processing unit 11, an information processing unit 12, and a mode controlling unit 13a. The information processing unit 11 is provided with a display unit 11a. The information processing unit 12 operates mutually in parallel with the information processing unit 11 and has a radio communication unit 12a. In each of the information processing units 11 and 12, for example, various application programs are executed under the control of individual CPUs and also an internal circuit operates.

The information processing unit 11 may include, in addition to the display unit 11a, a display requesting unit 11b and a telephone controlling unit 11c. The display unit 11a displays an image following instructions from the display requesting unit 11b and a display requesting unit 12b held by the information processing units 11 and 12 respectively. A liquid crystal monitor, for example, is used as the display unit 11a.

The display requesting unit 11b causes the display unit 11a to display an image in response to a request from a controlling unit (not shown) provided in the information processing unit 11. The telephone controlling unit 11c is a portion of the controlling unit provided in the information processing unit 11. The telephone controlling unit 11c is realized by a telephone application being executed and controls telephone processing through the radio communication unit 12a provided in the information processing unit 12. Further, the telephone controlling unit 11c requests the display of an image from the display requesting unit 11b.

As described above, the information processing unit 11 executes, for example, various application programs using the CPU to realize a controlling function of each program. The display requesting unit 11b receives, as one of such controlling functions, a display request from the telephone controlling unit 11c. However, the display requesting unit 11b may be able to cause the display unit 11a to display an image in response to a display request from other controlling functions in the information processing unit 11.

The information processing unit 12 may include, in addition to the radio communication unit 12a, the display requesting unit 12b and a telephone controlling unit 12c. The radio communication unit 12a transmits and receives data to/from external information processing equipment, for example, by performing radio communication with a base station.

The display requesting unit 12b causes the display unit 11a to display an image in response to a request from a controlling unit (not shown) provided in the information processing unit 12. The telephone controlling unit 12c is a portion of the controlling unit provided in the information processing unit 12. The telephone controlling unit 12c is realized by a telephone application being executed and controls telephone processing through the radio communication unit 12a. Further, the telephone controlling unit 12c requests the display of an image from the display requesting unit 12b.

Like the information processing unit 11, the information processing unit 12 executes, for example, various application program(s) using the CPU to realize a controlling function of each program. The display requesting unit 12b receives, as one of such controlling functions, a display request from the telephone controlling unit 12c. However, the display requesting unit 12b may be able to cause the display unit 11a to display an image in response to a display request from other controlling functions in the information processing unit 12.

The mode controlling unit 13a is accessible to each of the information processing units 11 and 12 and exercises control in such a way that one of the information processing unit 11 and the information processing unit 12 is in a master mode. More specifically, the mode controlling unit 13a exercises control as described below where the information processing units 11 and 12 switchably operate in a master and a slave mode.

If the mode controlling unit 13a exercises control so as to set the information processing unit 11 to the master mode, the display unit 11a, the display requesting unit 11b and the telephone controlling unit 11c are activated. Therewith, the information processing unit 12 is set to a slave mode in which only the radio communication unit 12a is active.

If, on the other hand, the mode controlling unit 13a exercises control so as to set the information processing unit 12 to the master mode, the radio communication unit 12a, the display requesting unit 12b and the telephone controlling unit 12c are activated. Therewith, the information processing unit 11 is set to the slave mode in which only the display unit 11a is active.

In the information processing apparatus 10, the information processing units 11 and 12 are controlled so that the display unit 11a concerning the display of an image and the radio communication unit 12a concerning a telephone call are always in an activation state by the mode controlling unit 13a. Accordingly, even if one information processing unit is set to the master mode, the other information processing unit is made to operate to provide a minimum necessary function such as the display and radio communication. Thus, the user can perform an operation including concerning a telephone call while always viewing an image displayed in the display unit 11a. Moreover, power consumption of the whole information processing apparatus 10 is reduced.

As an application example of a control, a master/slave mode control when an incoming call is terminated by the radio communication unit 12a is described below.

First, a case in which both the information processing units 11 and 12 are active will be described. When the radio communication unit 12a detects an incoming call from an outside source being terminated, the mode controlling unit 13a exercises control so as to set the information processing unit 11 to the master mode and the information processing unit 12 to the slave mode. Therefore, the information processing unit 11 realizes the telephone function via the radio communication unit 12a while using the display unit 11a.

Then, a case in which only the information processing unit 12 is active will be described. When the radio communication unit 12a detects an incoming call from an outside source being terminated, the mode controlling unit 13a exercises control so as to set the information processing unit 12 to the master mode and the information processing unit 11 to the slave mode. Therefore, the information processing unit 12 realizes the telephone function via the radio communication unit 12a while using the display unit 11a of the information processing unit 11.

With the control described above, the user can make a telephone call while using an image in accordance with activation condition(s) of the information processing units 11 and 12 when data is received by the radio communication unit 12a from an outside source. Thus, the information processing apparatus 10 can realize long-time use by reducing consumption of battery power.

Next, an embodiment based on the above overview is described with reference to the drawings. In an embodiment described below, a portable type information processing apparatus will be described as an example of the information processing apparatus.

Figure 2:
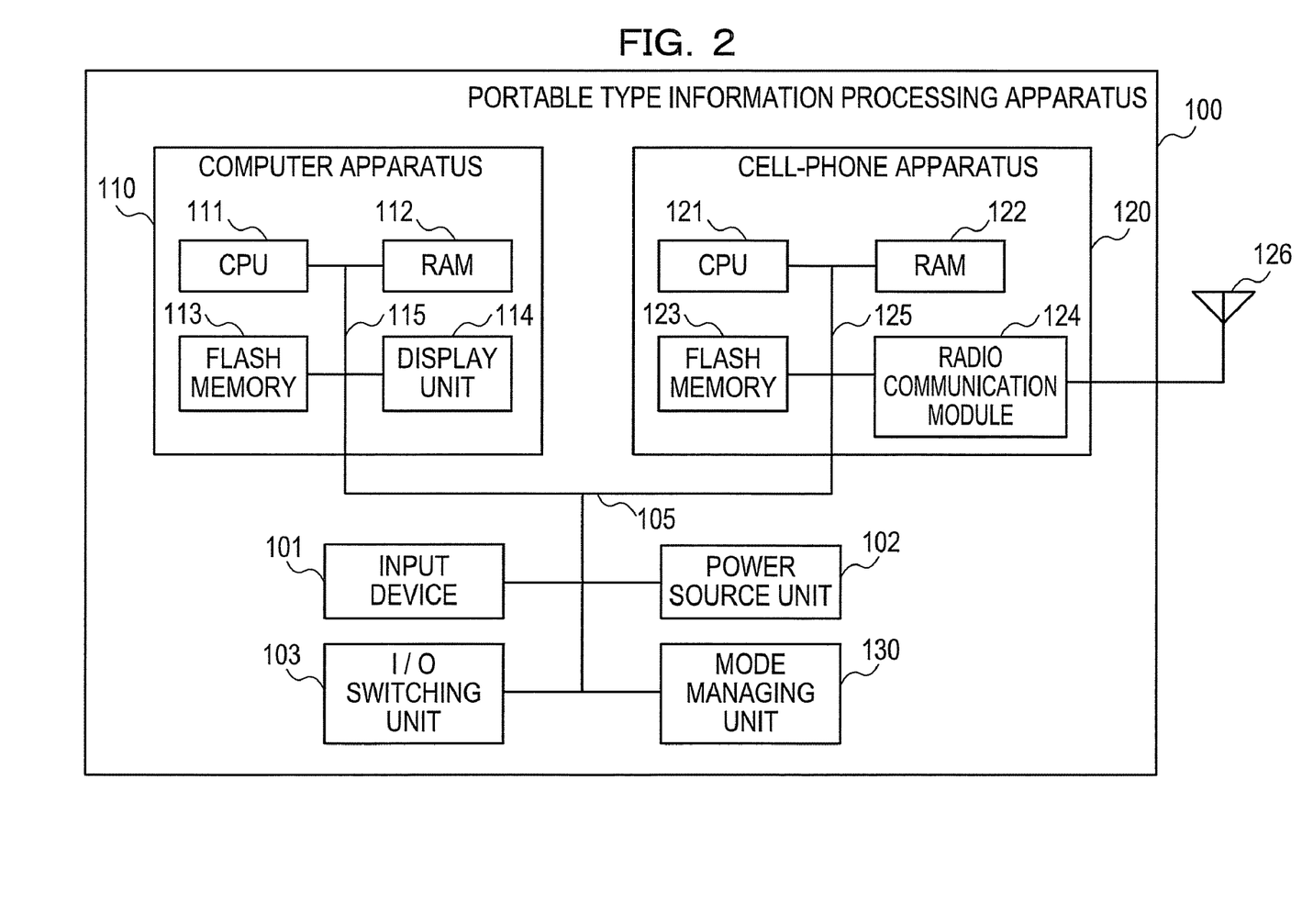
FIG. 2 is a diagram illustrating a hardware configuration of a portable type information processing apparatus according to an embodiment.

FIG. 2 is a diagram illustrating a hardware configuration of a portable type information processing apparatus according to an embodiment. A portable type information processing apparatus 100 is a portable type apparatus capable of executing operations of two information processing apparatuses, that is, a computer apparatus 110 and a cell-phone apparatus 120 in parallel. The computer apparatus 110 and the cell-phone apparatus 120 are connected in common to an input device 101, a power source unit 102, an I/O switching unit 103, and a mode managing unit 130 via a bus 105.

The input device 101 is used to input information into the computer apparatus 110 and the cell-phone apparatus 120. For example, a keyboard or a pointing device is used as the input device 101.

The power source unit 102 is connected to a battery (not shown) to supply power to each part of the portable type information processing apparatus 100.

The I/O switching unit 103 switches an operation target between the computer apparatus 110 and the cell-phone apparatus 120. With this switching, the input destination of information from the input device 101 is switched. The user can instruct the I/O switching unit 103, for example, to perform a switching operation by operating a changeover switch (not shown) provided in the portable type information processing apparatus 100.

The mode managing unit 130 monitors reception of data from outside the cell-phone apparatus 120 and the power source status of the computer apparatus 110. When reception of data of the cell-phone apparatus 120 is detected, the mode managing unit 130 exercises control so as to set one of the computer apparatus 110 and the cell-phone apparatus 120 to the master mode in accordance with a power source status of the computer apparatus 110 when reception of data is detected.

The input device 101, the power source unit 102, the I/O switching unit 103, and the mode managing unit 130 are configured to be shared by each of the computer apparatus 110 and the cell-phone apparatus 120. Moreover, the computer apparatus 110 and the cell-phone apparatus 120 are enabled to mutually transmit and receive data therebetween via the bus 105. However, due to sharing of each part or information transfer between the computer apparatus 110 and the cell-phone apparatus 120, instead of this configuration, another configuration may be adopted.

For example, a bus separate from the bus 105 connected to the input device 101 and the like may be provided to exchange information between the computer apparatus 110 and the cell-phone apparatus 120. In this case, if a processing function of the cell-phone is realizable even by the computer apparatus 110, as described above, commands for controlling call originating or call terminating processing and transmission and reception of e-mails may be transmitted/received to/from the cell-phone apparatus 120 via the bus.

Next, the hardware configuration of the computer apparatus 110 and the cell-phone apparatus 120 will be described with reference to FIG. 2.

The computer apparatus 110 is controlled by a CPU 111 in a unified fashion. A RAM 112, a flash memory 113, and a display unit 114 are connected to the CPU 111 via a bus 115.

The RAM 112 temporarily stores at least a portion of the OS and program(s) the CPU 111 is caused to execute. The RAM 112 also stores various kinds of data needed for processing by the CPU 111.

The flash memory 113 stores the OS and application program(s) in the computer apparatus 110. The flash memory 113 also stores various kinds of data needed for processing by the CPU 111.

The display unit 114 is a monitor caused to display an image following instruction(s) from the CPU 111 of the computer apparatus 110. Further, the display unit 114 is caused to display an image following instruction(s) from a CPU 121 of the cell-phone apparatus 120 via a bus 125 and the buses 105 and 115. A liquid crystal monitor, for example, is used as the display unit 114.

The computer apparatus 110 receives a control signal from the mode managing unit 130 via the external bus 105. The computer apparatus 110 also transmits and receives data to/from the cell-phone apparatus 120 via the bus 105. FIG. 2 shows a configuration in which each block inside the computer apparatus 110 is directly connected via the bus 115. However, for example, a configuration in which the CPU 111 and the RAM 112, the flash memory 113, and the display unit 114 are connected via a chip set may also be adopted. In this case, the external bus 105 may also be connected to the CPU 111 via the chip set.

The cell-phone apparatus 120 is controlled by a CPU 121 in a unified fashion. A RAM 122, a flash memory 123, and a radio communication module 124 are connected to the CPU 121 via the bus 125. An antenna 126 is connected to the radio communication module 124.

The RAM 122 temporarily stores at least a portion of the OS and program(s) the CPU 121 is caused to execute. The RAM 122 also stores various kinds of data needed for processing by the CPU 121.

The flash memory 123 stores the OS and application program(s) in the cell-phone apparatus 120. The flash memory 123 also stores various kinds of data needed for processing by the CPU 121.

The radio communication module 124 is provided with an RF (Radio Frequency) circuit for radio communication and a modulation/demodulation circuit for transmitted/received signals. By performing radio communication with a base station via the radio communication module 124 and the antenna 126, it becomes possible for the cell-phone apparatus 120 to perform transmission/reception of data and make a voice call with other information processing equipment such as a cell-phone.

In the portable type information processing apparatus 100 having the above configuration, the computer apparatus 110 may be a general-purpose information processing apparatus operated, for example, by various application program(s) stored in the flash memory 113 being executed by the CPU 111. In contrast, the cell-phone apparatus 120 is, for example, an information processing apparatus specialized mainly for processing to realize cell-phone functions. With such differences in configuration, the computer apparatus 110 needs, when compared with the cell-phone apparatus 120, a longer time for activation processing and larger power consumption during operation. However, as described below, if the computer apparatus 110 is started from the slave mode, the computer apparatus 110 is started in a shorter time than a normal starting time (when started from the master mode) and power consumption during operation after starting is reduced.

Figure 3:
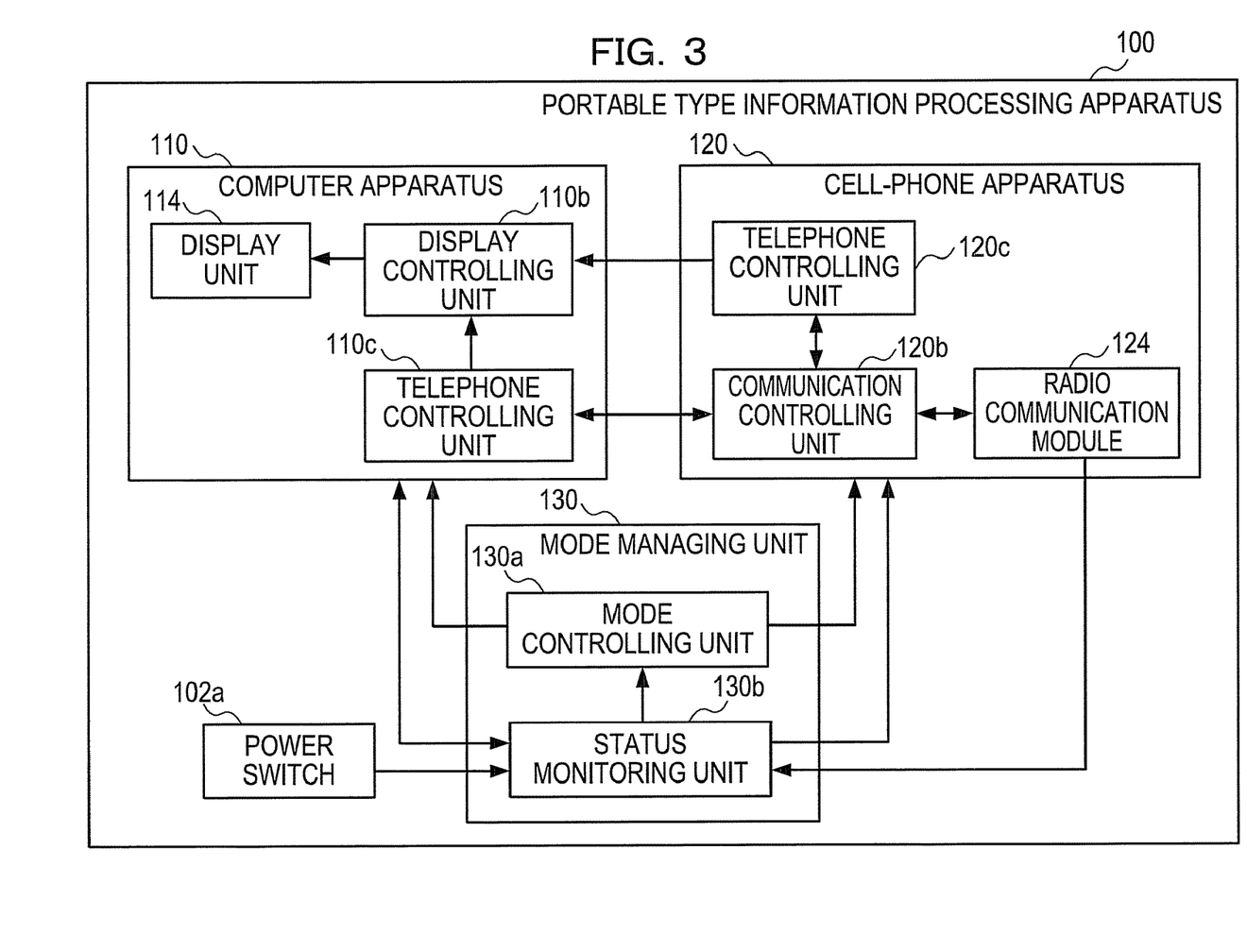
FIG. 3 is a block diagram illustrating function(s) of a portable type information processing apparatus according to an embodiment.

Further, while FIGS. 2 and 3 illustrate apparatuses 100, 110 and 120 as having specific components, the present invention is not limited to particular components. For example, some or all of the operations may be executed via a single or any combination of the components.

Next, the function configuration of the portable type information processing apparatus 100 will be described. FIG. 3 is a block diagram illustrating function(s) of a portable type information processing apparatus according to an embodiment.

The portable type information processing apparatus 100 having the hardware configuration shown in FIG. 2 includes the computer apparatus 110, the cell-phone apparatus 120, and the mode managing unit 130. In addition to the display unit 114, the computer apparatus 110 is provided with a display controlling unit 110b and a telephone controlling unit 110c.

The display unit 114 is a monitor caused to display an image following instruction(s) from the computer apparatus 110 or the cell-phone apparatus 120. The display controlling unit 110b causes the display unit 114 to display an image in response to a request from the controlling unit (such as the telephone controlling unit 110c or a telephone controlling unit 120c) provided in the computer apparatus 110 or the cell-phone apparatus 120. The display controlling unit 110b is realized, for example, by a program such as driver for controlling the display unit 114 being executed by the CPU 111.

The display controlling unit 110b receives input of information about an image to be displayed from the CPU 111 of the computer apparatus 110 or the CPU 121 of the cell-phone apparatus 120 when, for example, various application programs are executed in the computer apparatus 110 or the cell-phone apparatus 120. Then, the display controlling unit 110b causes the display unit 114 to display an image based on the image information.

The telephone controlling unit 110c is a portion of the controlling unit realized by an application program being executed by the computer apparatus 110. The telephone controlling unit 110c realizes the telephone function by a telephone application being executed by the CPU 111.

More specifically, the telephone controlling unit 110c requests a communication controlling unit 120b of the cell-phone apparatus 120 to execute communication processing for a telephone call through the radio communication module 124. Then, the telephone controlling unit 110c causes the communication controlling unit 120b to transmit sound data for a party (user) on the other end of the telephone line through the radio communication module 124 and receives sound data received by the radio communication module 124. The telephone controlling unit 110c also performs encode/decode processing of sound data to be transmitted or received. Further, the telephone controlling unit 110c requests the display controlling unit 110b to display an image when needed during such telephone processing.

The cell-phone apparatus 120 operates in parallel with the computer apparatus 110 and realizes cell-phone functions. The cell-phone apparatus 120 is also provided with the communication controlling unit 120b and the telephone controlling unit 120c. Functions of the radio communication module 124, the communication controlling unit 120b and the telephone controlling unit 120c of the cell-phone apparatus 120 may be realized by predetermined program(s) being executed by the CPU 121.

The communication controlling unit 120b causes the radio communication module 124 to perform communication processing in response to a request from the telephone controlling unit 110c or 120c. The communication controlling unit 120b is realized, for example, by a program such as driver for controlling the radio communication module 124 being executed by the CPU 121.

The telephone controlling unit 120c is a portion of the controlling unit realized by an application program being executed by the cell-phone apparatus 120. The telephone controlling unit 120c realizes the telephone function by a telephone application being executed by the CPU 121.

More specifically, the telephone controlling unit 120c requests the communication controlling unit 120b to execute communication processing for a telephone call through the radio communication module 124. Then, the telephone controlling unit 120c causes the communication controlling unit 120b to transmit sound data for a party (for example, subscriber user) on the other end of the telephone line through the radio communication module 124 and receives sound data received by the radio communication module 124. The telephone controlling unit 120c also performs encode/decode processing of sound data to be transmitted or received sound data. Further, the telephone controlling unit 120c requests the display controlling unit 110b to display an image when needed during such telephone processing.

The mode managing unit 130 accesses each of the computer apparatus 110 and the cell-phone apparatus 120. The mode managing unit 130 is provided with a mode controlling unit 130a and a status monitoring unit 130b and the function of the mode managing unit 130 is realized by each component.

The mode controlling unit 130a exercises control so as to set one of the computer apparatus 110 and the cell-phone apparatus 120 to the master mode in accordance with a power source status or the like of the computer apparatus 110. When the computer apparatus 110 is set to the master mode, the display unit 114, the display controlling unit 110b and the telephone controlling unit 110c are activated. Therewith, the mode controlling unit 130a sets the cell-phone apparatus 120 to the slave mode in which only the radio communication module 124 and the communication controlling unit 120b are activated. When, on the other hand, the cell-phone apparatus 120 is set to the master mode by the mode controlling unit 130a, the radio communication module 124, the communication controlling unit 120b, and the telephone controlling unit 120c are activated. Therewith, in this case, the mode controlling unit 130a sets the computer apparatus 110 to the slave mode in which only the display unit 114 and the display controlling unit 110b are activated.

When the status monitoring unit 130b detects an incoming call from an outside source being terminated by the radio communication module 124, the status monitoring unit 130b informs the mode controlling unit 130a of a current power source status of the computer apparatus 110 and the cell-phone apparatus 120. Incidentally, the status monitoring unit 130b detects an input operation to a power switch 102a provided to start up the computer apparatus 110.

Next, concrete operation(s) of the portable type information processing apparatus 100 including components described above will be described with reference to the drawings. In processing examples below, it is assumed that the cell-phone apparatus 120 is activated in advance and data is freely transmitted and received by the radio communication module 124.

In an embodiment, control is exercised so that when an incoming call is terminated by the radio communication module 124, the mode controlling unit 130a sets one of the computer apparatus 110 and the cell-phone apparatus 120 to the master mode in accordance with a power source status of the computer apparatus 110.

Figure 4:
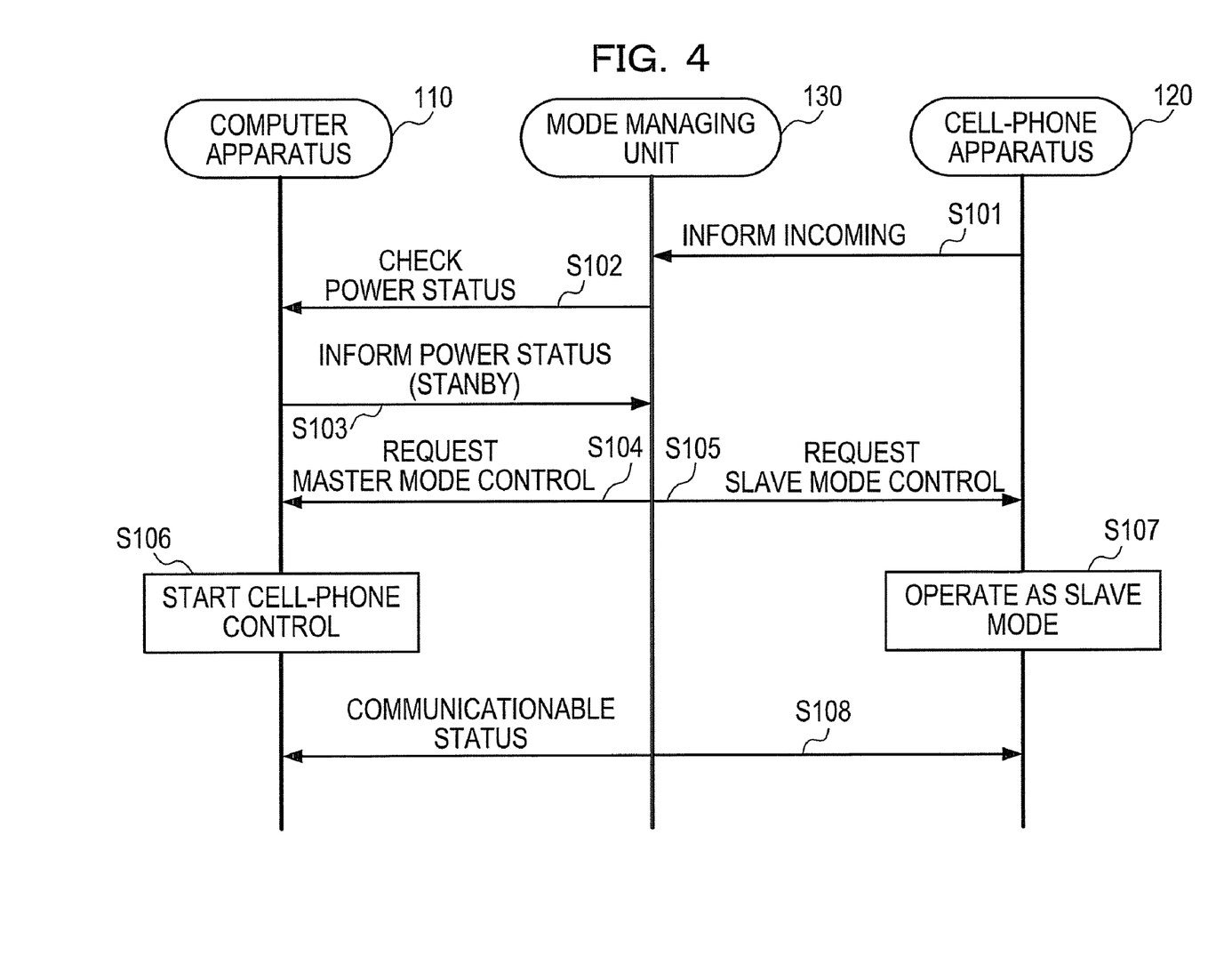
FIG. 4 is a sequence diagram illustrating when a computer apparatus of the portable type information processing apparatus according to an embodiment is in an activation state.
Figure 5:
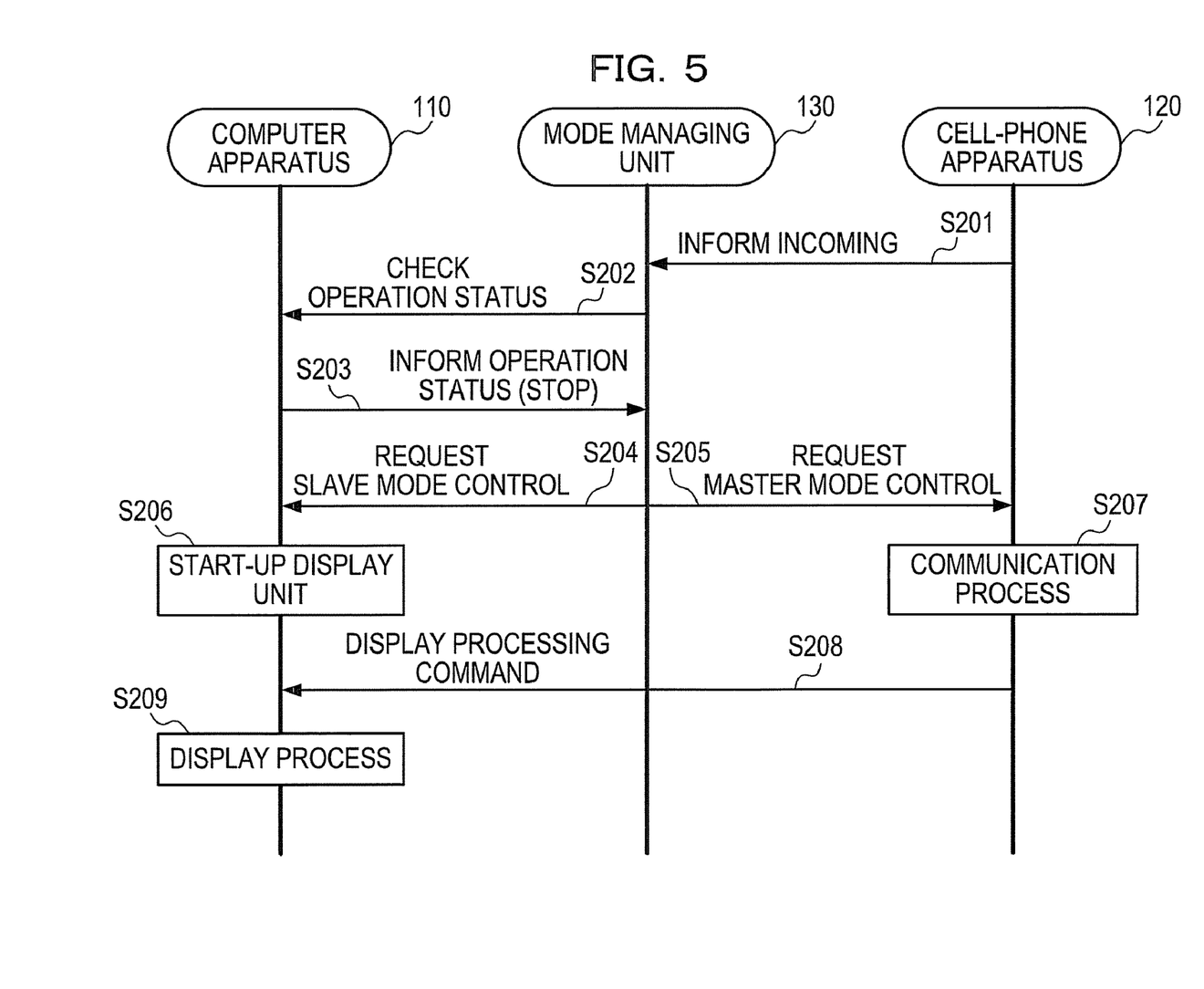
FIG. 5 is a sequence diagram illustrating when a computer apparatus of a portable type information processing apparatus according to an embodiment is in a stopped state.

FIG. 4 is a sequence diagram when a computer apparatus of a portable type information processing apparatus according to an embodiment is in an activation state. FIG. 5 is a sequence diagram when a computer apparatus of a portable type information processing apparatus according to an embodiment is in a stopped state.

FIGS. 4 and 5 show a state control of the computer apparatus 110 and the cell-phone apparatus 120 exercised by the mode controlling unit 130a, respectively, when the radio communication module 124 of the cell-phone apparatus 120 detects an incoming call from an outside source being terminated.

First, processing shown by the sequence diagram in FIG. 4 when data is received from an outside source by the radio communication module 124 in an activation state of the computer apparatus 110 is described.

As shown in FIG. 4, processing data of an incoming call is detected at operation S101. In operation S101, in the cell-phone apparatus 120, the radio communication module 124 terminates an incoming call. The status monitoring unit 130b detects a call terminating processing. Incidentally, the mode managing unit 130 is informed, for example, by the radio communication module 124 (or a function of the communication controlling unit 120b) that an incoming call being terminated is detected in the radio communication module 124.

When the mode managing unit 130, for example, is informed that an incoming call is terminated by the radio communication module 124, the status monitoring unit 130b checks the power source status of the computer apparatus 110 at operation S102.

If the computer apparatus 110 is activated, the computer apparatus 110, for example, informs the status monitoring unit 130b of the status thereof at operation S103. If the computer apparatus 110 is in power saving mode (standby state), the status monitoring unit 130b is informed of the mode thereof.

When the mode managing unit 130, for example, is informed that the computer apparatus 110 is activated, the mode controlling unit 130a, for example, requests the computer apparatus 110 to operate in the master mode at operation S104.

At operation S105, the mode controlling unit 130a of the mode managing unit 130 requests the cell-phone apparatus 120 to operate in the slave mode. If the standby state is informed at operation S103, the cell-phone apparatus 120 may be set to the slave mode after the return of the computer apparatus 110 to the activation state is detected by the status monitoring unit 130b.

At operation S106, in the computer apparatus 110, the telephone controlling unit 110c starts a telephone process through the radio communication module 124 provided in the cell-phone apparatus 120. If the computer apparatus 110 is in the standby state at operation S103, the telephone controlling unit 110c starts a telephone process after the computer apparatus 110 returns to the normal activation state. Moreover, an image is displayed in the display unit 114 by control of the telephone controlling unit 110c.

At operation S107, the cell-phone apparatus 120 starts an operation in the slave mode. That is, in the cell-phone apparatus 120, while the radio communication module 124 and the communication controlling unit 120b remain active, other functions including the telephone controlling unit 120c are stopped.

When a telephone process by the telephone controlling unit 110c is started in the computer apparatus 110, transmission and reception of data between the computer apparatus 110 and the cell-phone apparatus 120 start so that a telephone call can be made by the computer apparatus 110 at operation S108. At this point, the communication controlling unit 120b receives control information transmitted from the telephone controlling unit 110c of the computer apparatus 110 through the bus 105. The communication controlling unit 120b controls communication by the radio communication module 124 following the control information to perform radio communication for a telephone call. Moreover, sound data for a telephone call is transmitted and received between the telephone controlling unit 110c and the communication controlling unit 120b through the bus 105.

Next, processing shown by the sequence diagram in FIG. 5 when an incoming call from an outside source being terminated is detected by the radio communication module 124 in the stopped state of the computer apparatus 110 is described.

At operation S201, the mode managing unit 130, for example, is informed of an incoming data. In the cell-phone apparatus 120, the radio communication module 124 receives data. The status monitoring unit 130b detects the reception.

When the mode managing unit 130 is informed that data is received by the radio communication module 124, the status monitoring unit 130b checks a power source (operation status) status of the computer apparatus 110 at operation S202.

The computer apparatus 110 informs the status monitoring unit 130b that the computer apparatus 110 is stopped at operation S203.

When the mode managing unit 130 is informed that the computer apparatus 110 is in the stopped state, the mode controlling unit 130a, for example, activates the computer apparatus 110 in the slave mode at operation S204. Accordingly, the computer apparatus 110 is in the slave mode in which only the display unit 114 and the display controlling unit 110b are activated.

At operation S205, the mode controlling unit 130a of the mode managing unit 130 requests the cell-phone apparatus 120 to operate in the master mode.

At operation S206, the computer apparatus 110 activates the display unit 114 and the display controlling unit 110b. Hereinafter, the display unit 114 is used by the cell-phone apparatus 120. At this point, the controlling unit realized by execution of application programs including the telephone controlling unit 110c is not activated. In the slave mode, the CPU 111 of the computer apparatus 110 may operate following a slower clock signal than in normal operation.

The telephone controlling unit 120c of the cell-phone apparatus 120 starts a communication process (telephone process) through the radio communication module 124 at operation S207. Accordingly, the telephone controlling unit 120c provides a telephone call by voice or the like.

The telephone controlling unit 120c of the cell-phone apparatus 120 requests the display of an image (display processing command) in the display unit 114 through the display controlling unit 110b provided in the computer apparatus 110 when needed, at operation S208.

Upon receipt of a display request of an image, the display controlling unit 110b of the computer apparatus 110 displays an image in the display unit 114 at operation S209. With the control described above, a telephone call can be made while using an image in accordance with activation conditions of the computer apparatus 110 and the cell-phone apparatus 120 when an incoming call being terminated is detected by the radio communication module 124. At this point, the portable type information processing apparatus 100 can realize long-time driving by reducing consumption of battery power. Moreover, even if the computer apparatus 110 is in the stopped state, the display function such as the display unit 114 provided in the computer apparatus 110 can be activated in a short time before being used from the cell-phone apparatus 120 side.

In the above described embodiment, a state control is exercised, after detection of an incoming call from outside the radio communication module 124 being terminated, by the power source status being checked by the mode managing unit 130. On the other hand, an embodiment in which a state control is exercised in accordance with an input operation to the power switch 102a for power supply to the computer apparatus 110 is described below.

Figure 6:
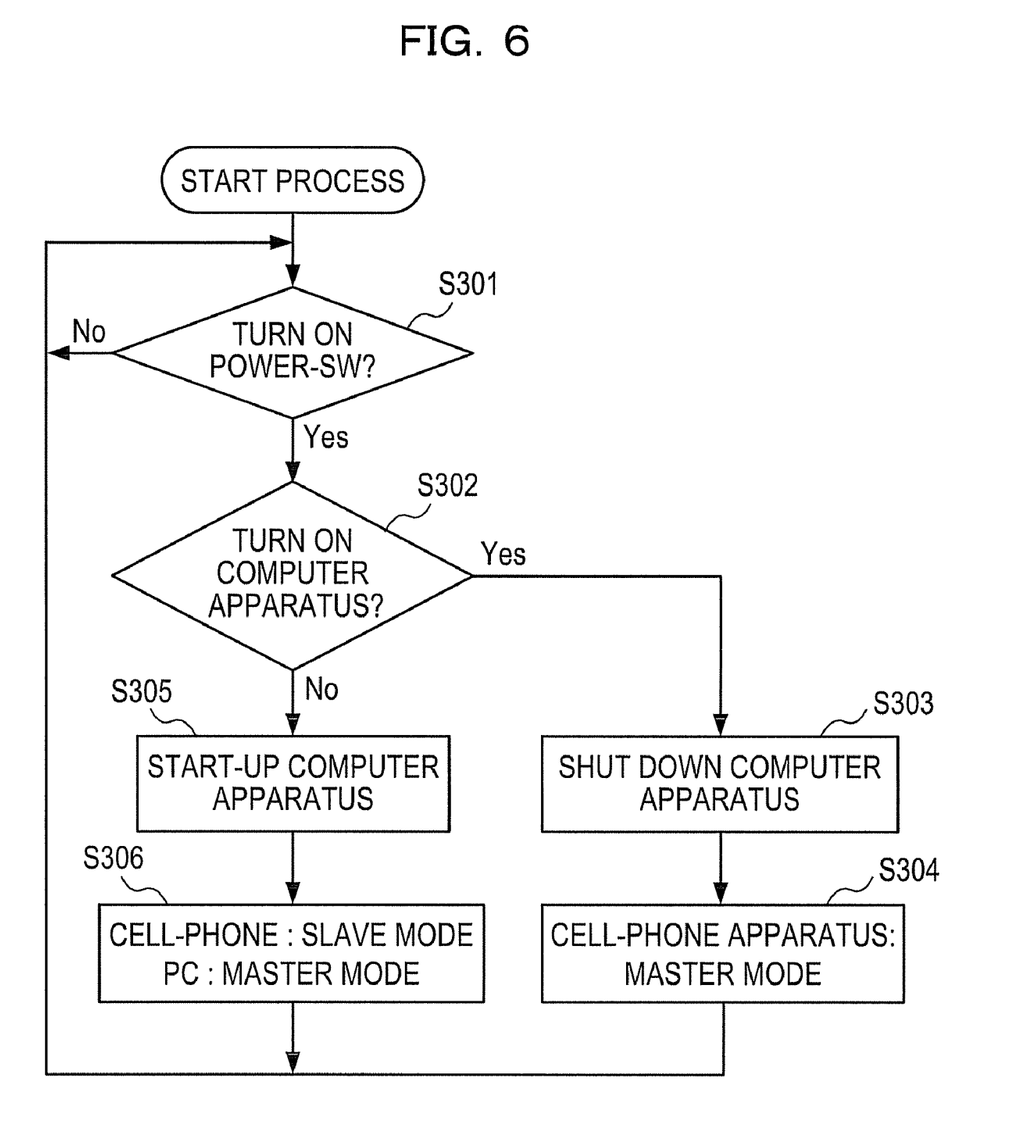
FIG. 6 is a flow chart showing processing of a mode managing unit for a power status of a computer apparatus according to an embodiment.

FIG. 6 is a flow chart showing processing of a mode managing unit for a power status of the computer apparatus according to an embodiment.

The flow chart shown in FIG. 6 shows processing of the mode managing unit 130 in accordance with an input operation to the power switch 102a for the computer apparatus 110. The processing is described below with reference to the flow chart.

The mode managing unit 130, for example, determines whether or not an input operation to the power switch 102a for power supply to the computer apparatus 110 has been performed at operation S301. If an input operation has been performed, processing proceeds to operation S302 and, if no input operation has been performed, processing at operation S301 is repeated.

The mode managing unit 130 determines whether or not the computer apparatus 110 is in an activation state (turned on), at operation S302. If the computer apparatus 110 is in the activation state, processing proceeds to operation S303 and, if the computer apparatus 110 is in a stopped state, processing proceeds to operation S305.

The mode controlling unit 130a of the mode managing unit 130 shuts down the computer apparatus 110 in the activation state at operation S303.

After shutting down the computer apparatus 110, the mode controlling unit 130a of the mode managing unit 130 exercises control so as to set the cell-phone apparatus 120 to the master mode at operation S304. Thus, even if the computer apparatus 110 is in the stopped state, the cell-phone apparatus 120 is always ready for terminating an incoming call from outside because the cell-phone apparatus 120 continues a waiting state. Incidentally, the cell-phone apparatus 120 may be maintained in the slave mode at operation S304.

Hereinafter, processing proceeds back to operation S301 again to monitor by the mode managing unit 130 an input operation to the power switch 102a.

The mode managing unit 130 activates (starts up) the computer apparatus 110 in the stopped state at operation S305.

Like operations S104 and S105 shown in FIG. 4, the mode controlling unit 130a requests the computer apparatus 110 to operate in the master mode and the cell-phone apparatus 120 to operate in the slave mode separately, at operation S306. At this point, processing similar to that at operations S106 and S107 shown in FIG. 4 is performed in the computer apparatus 110 and the cell-phone apparatus 120 respectively and the telephone controlling unit 110c starts a telephone process through the radio communication module 124 provided in the cell-phone apparatus 120. Therefore, when a telephone process by the telephone controlling unit 110c of the computer apparatus 110 is started, data is transmitted and received between the computer apparatus 110 and the cell-phone apparatus 120 so that a telephone call can be made by the computer apparatus 110. In a block at operation S306, the cell-phone apparatus 120 is denoted as "CELL-PHONE" and the computer apparatus 110 as "PC".

Hereinafter, processing proceeds back to operation S301 again to monitor by the mode managing unit 130 an input operation to the power switch 102a. With the control described above, a telephone call can be made while using an image in accordance with activation conditions of the computer apparatus 110 and the cell-phone apparatus 120 when an incoming call from outside is terminated by the radio communication module 124.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. An information processing apparatus, comprising:
a display unit that displays an image;
a radio communication unit that transmits and receives data with external apparatuses;
a first information processing unit having a first telephone controlling unit that controls a telephone process using the radio communication unit and a first display requesting unit that makes the display unit display the image in response to a request from the first telephone controlling unit;
a second information processing unit having a second telephone controlling unit and a second display requesting unit, the second telephone controlling unit controlling a telephone process using the radio communication unit, making the display unit display the image in response to a request from a control unit inside the second information processing unit including the second telephone controlling unit, and the second information processing unit being mutually operable in parallel with the first information processing unit; and
a mode controlling unit that controls one of the first information processing unit and the second information processing unit and sets to a master mode,
wherein when the mode controlling unit sets the first information processing unit to the master mode, the first telephone controlling unit, the first display requesting unit, and the display unit are activated, and the second information processing unit is set to a slave mode in which the radio communication unit is activated and other functions are inactivated, and
when the mode controlling unit sets the second information processing unit to the master mode, the second display requesting unit, the second telephone controlling unit, and the radio communication unit are activated, and the first information processing unit is set to the slave mode in which the display unit is activated and other functions are inactivated.

2. The information processing apparatus according to claim 1, comprising:
a status monitoring unit that monitors a power source status of each of the first information processing unit and the second information processing unit,
wherein when the mode controlling unit detects an incoming call from an outside source being terminated by the radio communication unit, based on a monitoring result by the status monitoring unit, the mode controlling unit sets the first information processing unit to the master mode and the second information processing unit to the slave mode when the first information processing unit is in an active state, and sets the second information processing unit to the master mode and the first information processing unit to the slave mode when the first information processing unit is in an inactive state.

3. The information processing apparatus according to claim 2, wherein the mode controlling unit sets the first information processing unit to the master mode and the second information processing unit to the slave mode based on a monitoring result by the status monitoring unit after the first information processing unit returns to an active state when the first information processing unit is in a power saving status.

4. The information processing apparatus according to claim 1, comprising:

a power source unit that supplies power to the first information processing unit, wherein the mode controlling unit sets the first information processing unit to the master mode by starting the power supply to the first information processing unit and the second information processing unit to the slave mode when the mode controlling unit detects an input operation to a power switch to activate the first information processing unit when the power supply to the first information processing unit is stopped, and sets the second information processing unit to the master mode and stops the power supply to the first information processing unit if the mode controlling unit detects the input operation to the power switch when the first information processing unit is in an active state.

5. A control method of an information processing apparatus, the method comprising:

controlling a telephone process using a radio communication unit by controlling a first telephone controlling unit after activating the first telephone controlling unit, a first display requesting unit, and the display unit provided in a first information processing unit and setting a second information processing unit to a slave mode in which the radio communication unit is activated and other functions are inactivated while displaying an image in a display unit of the first information processing unit in response to a request from a control unit inside the first information processing unit including the first telephone controlling unit when instructed by a mode controlling unit to set the first information processing unit to a master mode; and controlling the telephone process using the radio communication unit by controlling a second telephone controlling unit after activating a second display requesting unit, the second telephone controlling unit, and the radio communication unit provided in the second information processing unit and setting the first information processing unit to the slave mode in which the display unit is activated and other functions are inactivated while displaying an image in the display unit in response to a request from a control unit inside the second information processing unit including the second telephone controlling unit when instructed by the mode controlling unit to set the second information processing unit to the master mode, and where the radio communication unit exchanges data with external apparatuses and the second information processing unit is mutually operable in parallel with the first information processing unit.

* * * * *